(12) United States Patent
Whitmer

(10) Patent No.: US 10,235,463 B1
(45) Date of Patent: Mar. 19, 2019

(54) RESTORE REQUEST AND DATA ASSEMBLY PROCESSES

(71) Applicant: EMC Corporation, Hopkinton, MA (US)

(72) Inventor: Ray David Whitmer, Pleasant Grove, UT (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 417 days.

(21) Appl. No.: 14/578,151

(22) Filed: Dec. 19, 2014

(51) Int. Cl.
G06F 7/00 (2006.01)
G06F 17/00 (2006.01)
G06F 17/30 (2006.01)
H04L 29/08 (2006.01)

(52) U.S. Cl.
CPC .. *G06F 17/30867* (2013.01); *G06F 17/30106* (2013.01); *H04L 67/10* (2013.01); *H04L 67/32* (2013.01)

(58) Field of Classification Search
CPC ............. G06F 15/167; G06F 17/30575; G06F 17/30598; G06F 3/0601
See application file for complete search history.

(56) References Cited

U.S. PATENT DOCUMENTS

| | | | |
|---|---|---|---|
| 7,769,967 B2 | 8/2010 | Zhu et al. | |
| 7,873,601 B1 | 1/2011 | Kushwah | |
| 8,112,505 B1 | 2/2012 | Ben-Shaul | |
| 8,166,263 B2 | 4/2012 | Prahlad | |
| 8,200,926 B1 | 6/2012 | Stringham | |
| 8,285,682 B2 * | 10/2012 | Oza | G06F 9/542 707/646 |
| 8,312,356 B1 * | 11/2012 | Cousins | H03M 13/15 708/316 |
| 8,335,238 B2 * | 12/2012 | Arimilli | G06F 11/106 370/476 |
| 8,489,671 B2 | 7/2013 | Lepeska | |
| 8,639,781 B1 | 1/2014 | Motes | |
| 8,725,687 B2 | 5/2014 | Klose | |
| 8,732,479 B1 | 5/2014 | Henriksen | |
| 8,825,653 B1 | 9/2014 | Wang | |
| 8,904,125 B1 | 12/2014 | Elling | |

(Continued)

OTHER PUBLICATIONS

Symantec, Difference between synthetic backup/optimised synthetic backup and virtual synthetic backup, created Nov. 22, 2012, symantec.com, http://www.symantec.com/connect/forums/difference-between-synthetic-backup-optimised-synthetic-backup-and-virtual-synthetic-backup.

(Continued)

*Primary Examiner* — Hasanul Mobin
(74) *Attorney, Agent, or Firm* — Workman Nydegger

(57) ABSTRACT

In one example, a method is provided for data restore request and data assembly processes. Initially, a data range required by an application residing is identified at the client. The data range can embrace less than all the contents of a file with which the data range is associated. Next, a request is formulated at the client that includes the identified data range, and the request is then transmitted to a datacenter where the file was previously backed up. The requested data is subsequently transmitted from the data center to the client in an unassembled form. The client then assembles the received data and is able to perform various operations on the assembled data.

20 Claims, 5 Drawing Sheets

(56) References Cited

U.S. PATENT DOCUMENTS

| | | | |
|---|---|---|---|
| 8,954,663 B1* | 2/2015 | Klein | G06F 3/0619 |
| | | | 711/111 |
| 9,003,458 B2 | 4/2015 | Gonder | |
| 9,021,222 B1 | 4/2015 | Sadhu | |
| 9,141,542 B1* | 9/2015 | Justiss | G06F 17/30067 |
| 9,753,814 B1 | 9/2017 | Whitmer | |
| 2001/0013102 A1 | 8/2001 | Tsuchiya | |
| 2004/0206982 A1 | 10/2004 | Lee | |
| 2005/0251516 A1* | 11/2005 | Stakutis | H04L 67/00 |
| 2007/0088760 A1 | 4/2007 | Okitsu | |
| 2007/0094452 A1 | 4/2007 | Fachan | |
| 2007/0276885 A1 | 11/2007 | Valiyaparambil | |
| 2008/0005201 A1 | 1/2008 | Ting | |
| 2008/0183767 A1* | 7/2008 | Zhu | G06F 3/0608 |
| 2009/0313322 A1 | 12/2009 | Sheehan | |
| 2010/0174745 A1* | 7/2010 | Ryan | G06F 3/0608 |
| | | | 707/770 |
| 2010/0241726 A1* | 9/2010 | Wu | G06F 17/30233 |
| | | | 709/217 |
| 2010/0268902 A1* | 10/2010 | Drobychev | G06F 17/30091 |
| | | | 711/156 |
| 2010/0274784 A1* | 10/2010 | Acharya | G06F 17/3012 |
| | | | 707/736 |
| 2010/0293147 A1 | 11/2010 | Snow | |
| 2011/0167435 A1* | 7/2011 | Fang | G06F 9/544 |
| | | | 719/329 |
| 2011/0185355 A1 | 7/2011 | Chawla | |
| 2011/0191445 A1 | 8/2011 | Dazzi | |
| 2012/0005670 A1 | 1/2012 | Driesen | |
| 2012/0215882 A1 | 8/2012 | Goto | |
| 2012/0331108 A1 | 12/2012 | Ferdowsi | |
| 2013/0064370 A1* | 3/2013 | Gouge | H04L 63/0428 |
| | | | 380/255 |
| 2013/0151884 A1* | 6/2013 | Hsu | G06F 17/302 |
| | | | 714/4.11 |
| 2013/0226888 A1 | 8/2013 | Govind | |
| 2013/0239129 A1 | 9/2013 | Kim | |
| 2014/0040286 A1* | 2/2014 | Bane | G06F 17/30253 |
| | | | 707/754 |
| 2014/0095625 A1 | 4/2014 | Quan | |
| 2014/0108755 A1* | 4/2014 | Lue | G06F 3/0619 |
| | | | 711/162 |
| 2014/0108956 A1 | 4/2014 | Varenhorst | |
| 2014/0201154 A1 | 7/2014 | Varadharajan | |
| 2014/0201155 A1* | 7/2014 | Vijayan | G06F 11/1451 |
| | | | 707/647 |
| 2014/0279846 A1 | 9/2014 | Srinivasan | |
| 2014/0279956 A1 | 9/2014 | Trimble | |
| 2014/0304243 A1 | 10/2014 | Ramesh | |
| 2014/0310245 A1 | 10/2014 | Novick | |
| 2015/0293699 A1* | 10/2015 | Bromley | G06F 3/067 |
| | | | 711/161 |
| 2015/0293986 A1* | 10/2015 | Verge | G06F 17/30135 |
| | | | 707/821 |
| 2016/0094585 A1* | 3/2016 | Shahbazian | H04L 63/205 |
| | | | 726/1 |

OTHER PUBLICATIONS

U.S. Appl. No. 14/578,168, May 11, 2017, Notice of Allowance.
U.S. Appl. No. 14/578,113, May 3, 2017, Office Action.
U.S. Appl. No. 14/578,113, filed Dec. 19, 2014, Whitmer.
U.S. Appl. No. 14/578,162, filed Dec. 19, 2014, Whitmer, et al.
U.S. Appl. No. 14/578,168, filed Dec. 19, 2014, Whitmer.
U.S. Appl. No. 14/578,172, filed Dec. 19, 2014, Whitmer.
U.S. Appl. No. 14/578,162, Feb. 10, 2017, Office Action.
U.S. Appl. No. 15/648,116, filed Jul. 12, 2017, Whitmer.
U.S. Appl. No. 15/670,444, filed Aug. 7, 2017, Whitmer.
U.S. Appl. No. 14/578,162, filed Aug. 15, 2017, Office Action.
U.S. Appl. No. 14/578,172, Oct. 18, 2017, Office Action.
U.S. Appl. No. 14/578,113, Nov. 16, 2017, Final Office Action.
U.S. Appl. No. 14/578,162, Feb. 26, 2018, Final Office Action.
U.S. Appl. No. 147/578,113, filed Feb. 26, 2018, Advisory Action/ Interview Summary.
U.S. Appl. No. 14/578,113, May 24, 2018, Notice of Allowance.
U.S. Appl. No. 14/578,172, May 31, 2018, Notice of Allowance.
U.S. Appl. No. 14/578,162, Jun. 7, 2018, Notice of Allowance.

* cited by examiner

RESTORE REQUEST AND DATA ASSEMBLY PROCESSES

RELATED APPLICATIONS

This application is related to the following applications filed the same day herewith: U.S. patent application Ser. No. 14/578,113 entitled PRESENTING CLOUD BASED STORAGE AS A VIRTUAL SYNTHETIC; U.S. patent application Ser. No. 14/578,162 entitled NEARLINE CLOUD STORAGE BASED ON FUSE FRAMEWORK; U.S. patent application Ser. No. 14/578,172 entitled RESTORE PROCESS USING INCREMENTAL INVERSION; and, U.S. patent application Ser. No. 14/578,168 entitled APPLICATION LEVEL SUPPORT FOR SELECTIVELY ACCESSING FILES IN CLOUD-BASED STORAGE. All of the aforementioned applications are incorporated herein in their respective entireties by this reference.

FIELD OF THE INVENTION

Embodiments of the present invention generally concern mechanisms for enabling user access to data stored at a datacenter. More particularly, at least some embodiments of the invention relate to systems, hardware, computer-readable media, and methods for requesting backed up data, and then assembling the data when received from the backup location.

BACKGROUND

Entities often generate and use data that is important in some way to their operations. This data can include, for example, business data, financial data, and personnel data. If this data were lost or compromised, the entity may realize significant adverse financial and other consequences. Accordingly, many entities have chosen to back up some or all of their data so that in the event of a natural disaster, unauthorized access, or other events, the entity can recover any data that was compromised or lost, and then restore that data to one or more locations, machines, and/or environments.

Increasingly, entities have chosen to back up their important data using cloud based storage. The cloud based approach to backup has proven attractive because it can reduce, or eliminate, the need for the entity to purchase and maintain its own backup hardware. Cloud based storage is also flexible in that it can enable users anywhere in the world to access the data stored in the cloud datacenter. As well, the user data is protected from a disaster at the user location because the user data is stored in the cloud data center, rather than on backup hardware at the user location.

While advantageous in certain regards, the use of cloud based storage has introduced some new problems however. For example, some cloud based storage systems and services require that a user download an entire file from the datacenter to the local user machine before the user can fully access that file. Depending upon the size of the file and the capacity of the communication line connecting the user with the datacenter, this process can be unacceptably long. For example, it can take a significant amount of time to restore a database, mailbox, or virtual machine disk file.

Moreover, there may not be a need to restore the entire file to the local user machine. This circumstance can arise where, for example, it is adequate for the purposes of a user to restore a dataset that is only a subset of a larger dataset. To illustrate, a user may only need to restore a particular email, and does not need to restore the entire mailbox that includes the email.

In light of problems and shortcomings such as those noted above, it would be useful to be able to identify, at a client for example, selected portions of a file, database, or other dataset, for retrieval. As well, it would be useful to be able to assemble, at a client for example, the requested portions of data received from a datacenter.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
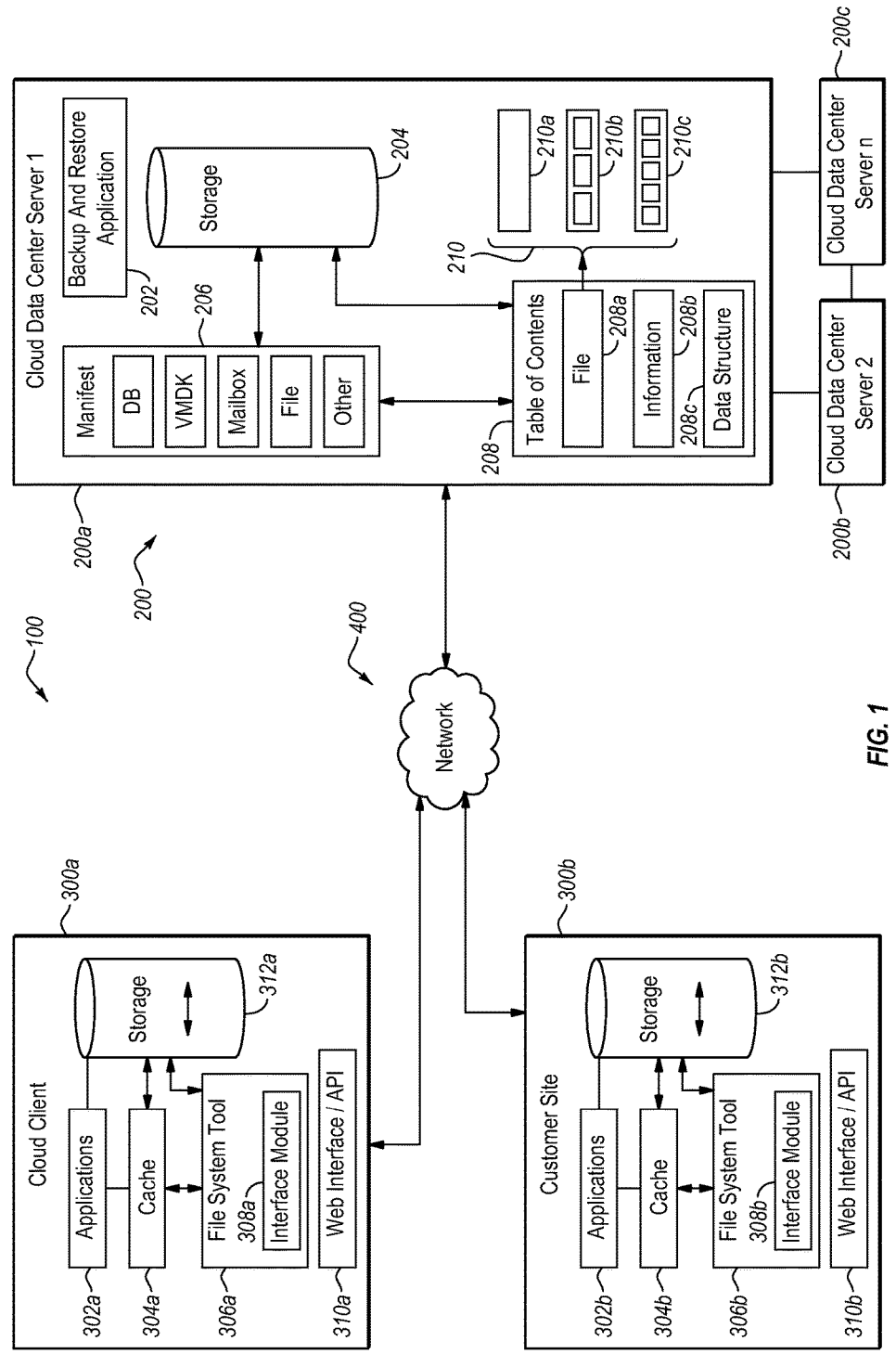
FIG. 1 is directed to aspects of an example operating environment for at least some embodiments.

Embodiments of the present invention generally concern systems, hardware, computer-readable media and methods for performing processes such as data backup, retrieval and restore operations in environments, such as cloud environments for example, that include a datacenter where one or more backups are stored. For example, at least some embodiments of the invention relate to systems, hardware, computer-readable media, and methods for requesting backed up data, and then assembling the data when received from the backup location.

In at least some embodiments, a user at a client system may have a need to perform various operations with respect to a backed up dataset, or portion of a backed up dataset. Where the backed up dataset is relatively large, such as in the case of a database, a mailbox, or VM disk backup for example, it may be impractical to return the entire file to the client system.

Thus, some embodiments provide for a client side application, such as a file system tool for example, that enables a user to specify a particular data range, such as a byte range for example, to be retrieved from the datacenter and returned to the client. Because the specified data range spans less, possibly substantially less, than the entire file, the desired range can be returned from the datacenter to the client relatively quickly, and identification and retrieval of that range may consume relatively fewer datacenter and communication resources than would be the case if the entire file were to be retrieved and transmitted from the datacenter to the client.

The desired data range can be specified in a variety of ways. For example, in some particular embodiments, a file request by a particular client application can be translated by the application, or by a client side tool, into a request for a particular data range, such as a byte range. Where the client side tool formulates the request, the application may view the request simply as a file read request. In any event, the specification of the desired data range can be performed automatically and may be transparent to a user at the client system. In some embodiments, a FUSE file can enable specification of a particular byte range.

In some embodiments, a client may request and receive multiple data ranges. These data ranges can be combined in a single request, or there may a separate request for each data range.

After the data range request, or requests, have been formulated and transmitted to the datacenter, the datacenter can then locate and retrieve the requested data, which can be in block form, or any other suitable form. In some instances, the requested data ranges may refer to data in different respective incrementals and/or in a baseline dataset. In this case, the requested data can be returned by the datacenter to the client in parallel streams.

Once the data has been received at the client, a file system tool or other application at the client can reassemble the data into the form needed by the application in connection with which the data range request(s) were made. In some cases, the data received at the client from the datacenter may be received in an encrypted and compressed form. Thus, at least some embodiments of the invention involve decompression and decryption of data received from the datacenter. The decryption and decompression could be performed using a pre-defined key held at the client.

When client operations concerning the retrieved data have been completed and the data is ready for backup, the data can be transmitted to the datacenter and backed up. Example processes for backing up data at the datacenter, and processes for returning data from the datacenter in response to a client request, are addressed in one or more of the applications listed in the RELATED APPLICATIONS section of this application.

A. Example Operating Environments

In general, embodiments of the invention may include and/or be implemented in an operating environment that includes one or more clients and one or more backup servers. As used herein, the term client is intended to have broad scope and embraces, among other things, any system, device, or combination of those, by way of which direct access to cloud based storage can be achieved. As such, one or more clients may be in a cloud system, and/or one or more clients may be located at a customer site. Similarly, the term backup server is intended to have broad scope, and embraces, among other things, any backup server and associated storage device or system that are located remotely relative to a client. As such, one or more backup servers may be part of a cloud based storage system, such as a cloud datacenter, for example.

With attention now to FIG. 1, details are provided concerning some operating environments, one example of which is denoted at 100, in connection with which various embodiments of the invention may be employed. In FIG. 1, the example operating environment 100 may be a network such as a local area network, a wide area network, the internet, or any other networked configuration. Moreover, the operating environment 100, or any group of one or more of its elements, may comprise, form an element of, or constitute, a cloud computing environment. The environment 100 may include various devices including servers and other computers that are interconnected. The operating environment 100 may employ a variety of communication media, such as hardwire, wireless, or some combination thereof. In some instances, some or all of the operating environment 100 may comprise an optical communication network.

As indicated in FIG. 1, the example operating environment 100 includes a cloud datacenter 200 that may include one or more cloud datacenter servers, such as datacenter servers 200a, 200b and 200c. For the purposes of the discussion, only datacenter server 200a will be discussed but it should be understood that datacenter servers 200b and 200c may be similar, or identical, to datacenter server 200a in terms of operation and/or configuration. In at least some embodiments, two or more of the datacenter servers 200a-200c can communicate with each other, although that is not required. In general, the datacenter server 200a is implemented as a backup server that is able to communicate with one or more clients 300a and 300b, either directly or by way of an a communications network 400, to transmit data to, and receive data from, the clients 300a and 300b. Examples of backup servers include, but are not limited to, the EMC Avamar server, and the EMC NetWorker server.

With continued reference to FIG. 1, further details are provided concerning the example datacenter server 200a. As indicated, the datacenter server 200a may include a backup and restore application 202 that cooperates with a file system tool, discussed below, residing on one or more clients such as clients 300a and 300b, to restore requested data to the clients. The datacenter server 200a also includes, or has access to, storage 204 that stores backup data for one or more clients. The data stored for each client can include one or more backups of that client, or a portion of that client.

To facilitate management of backup and restore processes, including the generation and presentation of virtual synthetics, the datacenter server 200a may also include a manifest 206 and a table of contents 208. A manifest 206 and table of contents 208 can be provided on any number of different bases including, for example, for each client, or for each backup of a client or client file. It should be noted that metadata concerning data residing at the datacenter is not required to also reside at the datacenter. For example, the table of contents 208 and/or manifest 206 can, more generally, be stored anywhere that is accessible by a file system tool, examples of which are discussed in more detail below.

With reference first to the manifest 206, the manifest 206 may be generated at the time a backup is created. In general, the manifest 206 may take the form of a listing of various types of information and data structures that have been backed up. Thus, in the illustrated non-limiting example, the manifest 206 lists a database, a .VMDK file, a mailbox, a file, and one or more various other backed up information and/or data structures. In general, any material(s) capable of being backed up and restored can be included in the manifest 206, and there are no constraints, for example, as to the type, size and number of information and data structures that can be reflected in the manifest 206. In at least some particular embodiments, relatively large files such as virtual machine disk files and mailbox files are listed in the manifest 206.

As noted earlier, the cloud datacenter server 200a may also include a table of contents 208. In general, the table of contents 208 serves to keep track, such as by mapping for example, of incremental changes that have been made to information listed in the manifest 206 and stored by the datacenter server 200a. For example, the table of contents 208 may include entries 208a, 208b and 208c that including information concerning, respectively, a file, information, and a data structure. Each of the entries can include various types of information concerning the data with which that particular entity is associated.

For example, an entry 208a may include a mapping that indicates the byte range, in storage, that is spanned by the file to which the entry 208a corresponds. As well, the mapping could also indicate other information, such as where the bytes of that byte range are stored, the type of compression and/or encryption used on those bytes, and any other information concerning the bytes of the file.

As well, the table of contents 208 may provide mapping to one or more incremental changes 210, or simply incrementals, to any of the entries in the table of contents 208, such as the entry 208a for example. That is, the table of contents 208 can reference one, some, or all, of the incremental changes that have been made over time to the file to which entry 208a corresponds. Among other things, this approach can enable a user to request a file, or other information, as that file or information existed at a particular point in time. In the particular example of FIG. 1, the table of contents 208 maps to the original file version 210a, and also maps to first and second incrementals 210b and 210c, respectively. Each of the incrementals 210 represents a different set of changes to the file to which entry 208a corresponds, and each of the incrementals 210 corresponds to a different respective point in time. Moreover, and as suggested in FIG. 1, each of the incrementals 210 is relatively smaller in size than the file to which the incremental 210 corresponds. Thus, when a file version is requested, the entire file need not be sent to the requestor. Instead, only the incremental changes through the date of interest are required to be sent.

With continued reference to FIG. 1, and as noted earlier, a cloud datacenter including one or more datacenter servers may communicate with one or more clients, two examples of which are denoted at 300a and 300b, respectively. As the clients 300a and 300b may share a number of similarities, only client 300a is addressed in the following discussion.

Among other things, the client 300a may include one or more applications 302a, a local cache 304a, a file system tool 306a that includes an interface module 308a, a web interface/API 310a and local storage 312a. With reference first to the applications 302a, example applications include, but are not limited to, word processing, email, a backup and restore client, database management, and any other application(s) capable of generating data that can be backed up at the cloud datacenter 200. As discussed in more detail elsewhere herein, one or more of the applications may directly or indirectly request data from the cloud datacenter 200 and the requested data can be stored in the local cache 304a when received by the file system tool 306a of the client 300a. In at least some instances, requests for data from the cloud datacenter 200 can be formulated by the file system tool 306a and transmitted by way of the web interface/API 310a/310b using an application program interface (API) such as the RESTful (REpresentational State Transfer) HTTP-based API, although other mechanisms can be used instead of the RESTful HTTP-based API. More generally, backend storage can be any cloud API that supports requesting specific ranges of content from a datacenter or other data repository.

The interface module 308a, which could take the form of a plug-in, can be used by the file system tool 306a to provide the user with a representation of a virtual file system that includes representations of the files of the user that are stored at the cloud datacenter 200. That is, the file system tool 306a can present a standard file system interface to a user at the client. This interface may have both visual and functional aspects. To briefly illustrate, the representation could appear to the user as a display of a virtual file structure. In one particular example, discussed in more detail in a related application, the interface module 308a may take the form of a file system driver, such as the Filesystem in Userspace (FUSE) operating system mechanism, although other drivers, mechanisms and interfaces could alternatively be employed. As well, one example of a file system tool 306a may be referred to herein as a Data Protection Cloud File System (DPCFS).

The file system tool 306a operates in connection with the interface module 308a. For example, the file system tool 306a not only requests data needed by the user but, responding to user commands provided by way of the interface module 308a, the file system tool 306a can perform or cause the performance of a variety of file system operations, examples of which include, but are not limited to, open, view, search, read, write, move, and delete. In addition to these operations, the file system tool 306a can perform, or cause the performance of, a variety of other operations not specifically requested by the user. Such other operations can include, for example, creating a manifest, submitting changes to an existing manifest such as manifest 206, submitting changes to a table of contents such as the table of contents 208, and defining and transmitting a request to provide and mount a remote file system that represents user data. Yet other operations that can be performed by the file system tool 306a include, for example, compression, encryption, decompression, decryption, and deduplication.

B. Example Host Configuration

Figure 2:
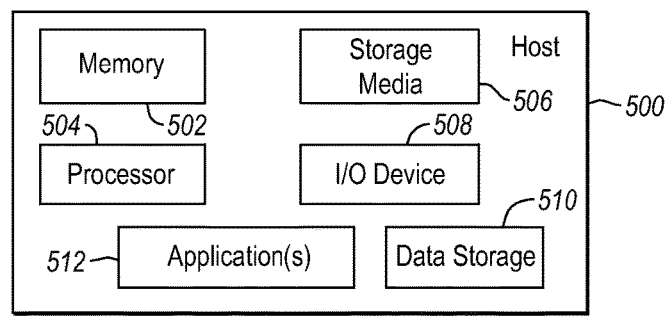
FIG. 2 is directed to an example implementation of a computing device, such as a host, that may be employed with at least some embodiments.

Any one or more of the clients 300a, 300b, and cloud datacenter server 200a can take the form of a physical computing device, one example of which is denoted at 500. In the example of FIG. 2, the computing device 500 includes a memory 502, one or more hardware processors 504, non-transitory storage media 506, I/O device 508, and data storage 510. As well, one or more applications 512 are provided that comprise executable instructions. Such executable instructions can take the form of one or more of a backup application, and a backup client, for example.

C. General Aspects of a Backup Scheme

Figure 3:
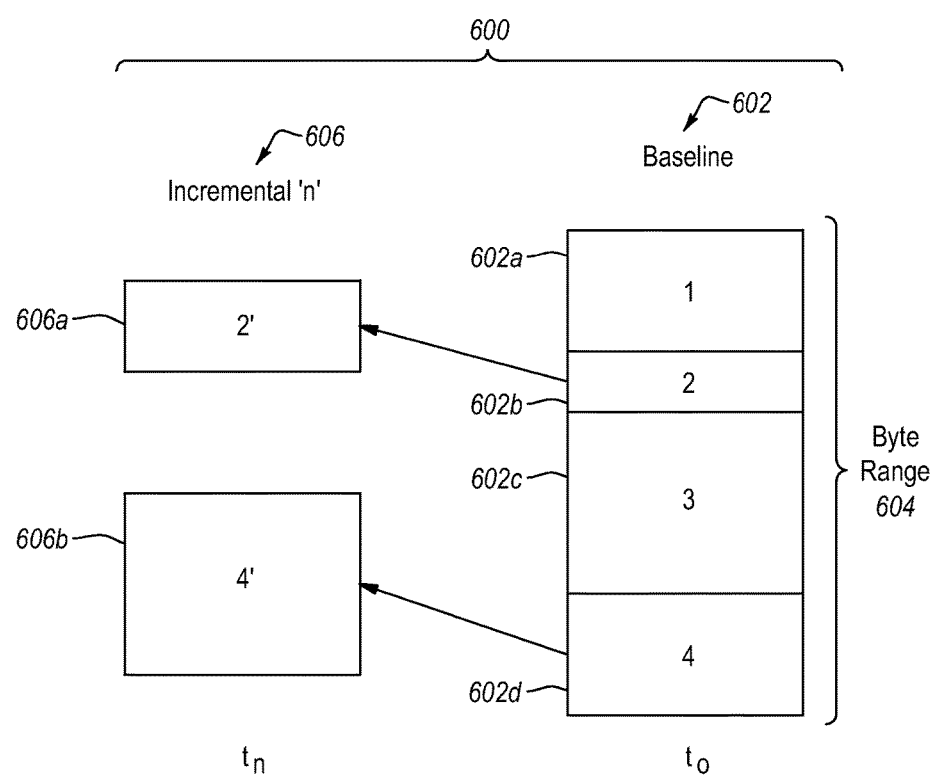
FIG. 3 is an example of a scheme for backing up data.

With attention now to FIG. 3, details are provided concerning an example scheme for backing up data. The scheme can be implemented in connection with a backup history. As noted elsewhere herein, embodiments of the invention can be advantageous insofar as they enable a client to directly access datacenter backup data, such as after a disaster has occurred, while avoiding the need to download entire files or other datasets to the client from the datacenter. More particularly, a user may only have to download parts of a dataset of interest.

In the example of FIG. 3, a backup history for a dataset, which could be a file, a file structure, a byte range, or any other dataset of any size, is indicated generally at 600. In general, the backup history 600 includes a baseline dataset 602 that in this illustrative example includes four blocks, namely, 602a (1), 602b (2), 602c (3) and 602d (4). In some embodiments, these blocks may be referred to as chunks of data. As well, the pieces or chunks of data may have a size that is variable. The four blocks of data 602a-602d collectively define a corresponding data range, which can be expressed in terms of bytes, namely, a byte range 604, but can alternatively be expressed in any other suitable terms. The baseline dataset 602 reflects the content of a particular dataset as that particular dataset was initially backed up at a datacenter, such as a cloud datacenter, for example. This initial backup of the baseline dataset 602 is indicated as having occurred at time $t_0$.

Over a period of time, one or more changes may be made, by an application for example, relative to the baseline dataset 602. Each change can be backed up at the datacenter, so that the changes accumulated over time collectively define the backup history 600 associated with the baseline dataset 602. As indicated in FIG. 3, the entire updated dataset need not be stored. Instead, only the changes to the preceding version of the dataset are stored, in a form referred to as an incremental backup, or simply an incremental. Thus, the amount of storage space required to save the backup history 600 is significantly smaller than if updated versions of the entire baseline dataset 602 were required to be stored.

Any number 'n' of incrementals associated with the baseline dataset 602 can be created and stored. In the example of FIG. 3, an incremental 'n' is stored at the datacenter at a time $t_n$ that is subsequent to time $t_0$ when the baseline dataset 602 was stored. The incremental 'n' includes only two blocks, namely, blocks 606a and 606b. This reflects the fact that changes have been made to only two blocks associated with the baseline dataset 602. In particular, the changed version of block 602b (2) is block 606a (2') and the changed version of block 602d (4) is block 606b (4'). FIG. 3 also indicates that the relative size of the blocks can change as modifications, reflected by incremental 'n,' are made.

As the foregoing example illustrates, and discussed in further detail below, a user requesting access to a dataset as it existed at time $t_n$ need only be sent blocks 606a and 606b from the datacenter, since no changes have been made, as of time $t_n$, to the other blocks associated with the baseline dataset 602.

D. Example Request and Retrieve Methods

While, as noted elsewhere herein, embodiments of the invention may be advantageous at least inasmuch as a user does not need to download entire datasets such as files or file systems, the user nonetheless needs a mechanism that allows the user to interact with data stored at the datacenter so that the user can perform desired operations concerning the backed up data. Such operations may be necessary when, for example, a disaster has occurred and the user does not have access to local data. Such operations can also be performed during normal operating conditions.

Figure 4:
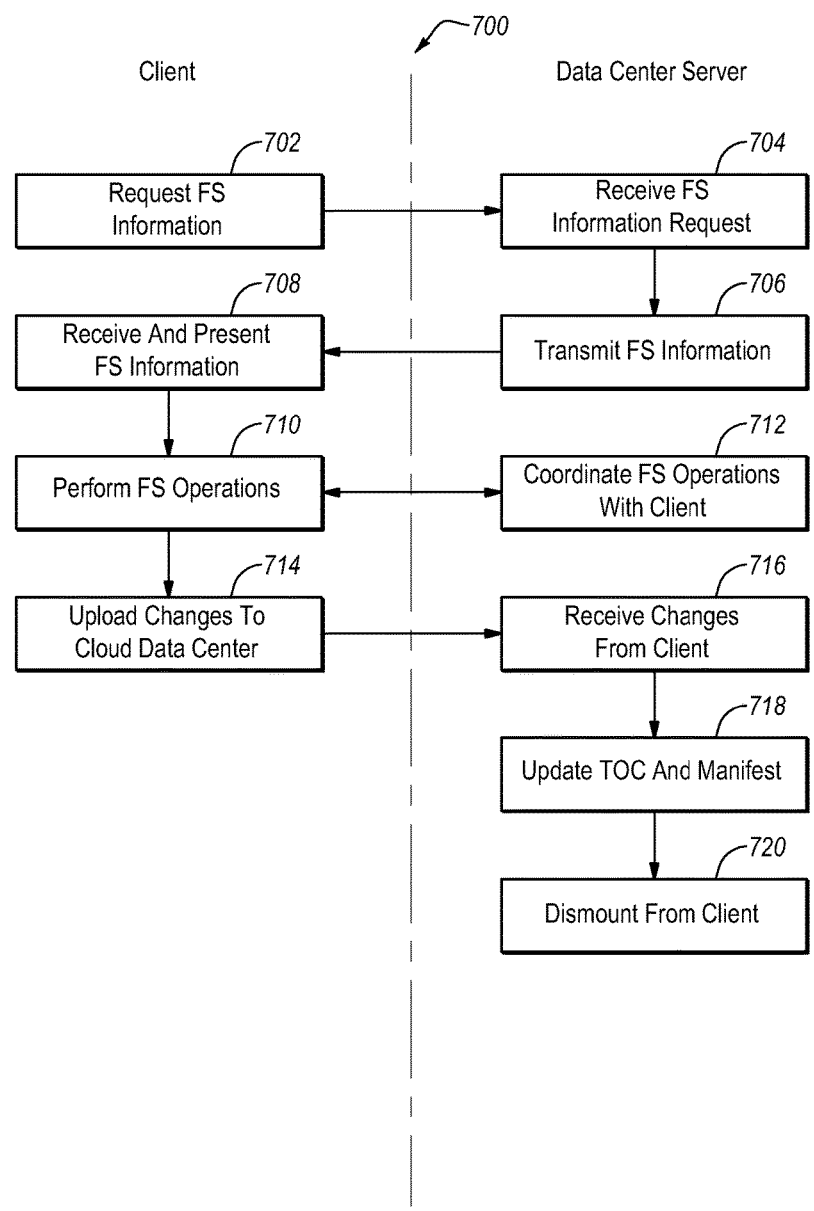
FIG. 4 is a flow diagram disclosing general aspects of a method for backing up data.

With the foregoing points in mind, an example method denoted in FIG. 4 at 700 begins when a user at a client machine requests 702 file system information from the datacenter. The requested file system information can be any information concerning a file system with which a file of interest to the user is associated. For example, the file system information could include aspects of a standard file system interface, such as one or more of a file structure, directories, and filenames. At 704, the file system information request is received at the datacenter server and at 706, the requested information is gathered and transmitted to the client.

Next, the file system information is received and presented, by way of a browser for example, at the client 708. The file system information can be presented in the form of a file system interface, for example, but that particular form is not necessarily required and any other form that enables a user to perform file system operations such as open, view, search, read, write, move, and delete, can alternatively be employed.

The file system information received from the datacenter server can be presented to the user as a virtual display. That is, the file system information can be presented 708 to the user at the client in such a way that it appears to the user that the datacenter file system is located locally at the client when, in fact, the file system is actually located only at the datacenter server. One advantage of this approach is that it eliminates the need to download an entire file structure to the client.

After the file system information has been presented 708 to the user at the client, the user can then perform 710 various file system operations concerning files and other datasets that are presented as part of the file system information. These operations can be performed in conjunction with an application and/or with a file system tool. By way of illustration, an user can write to a document using a word processing application such as MS Word®, or a user can read an email using MS Exchange®. As well, a file system tool can enable a user to perform file system operations such as move, delete, or rename, for example, regarding one or more files. The performance of file system operations is coordinated 712 with the datacenter server.

As disclosed elsewhere herein, one advantage of at least some embodiments is that file system operations can be performed at a client without the need to download the entire file in connection with which the user intends to perform such file system operations. In any case, after a user has performed the desired file system operations, any changes to the data associated with those file system operations can then be uploaded 714 to the datacenter server. After receipt 716 of the changes to the data, the datacenter server can then update 718 a table of contents and a manifest associated with the file, database, or other dataset, with which the changes are concerned. Finally, at 720, the datacenter can coordinate with the client to dismount the file system data that was transferred, as part of 712/714, from the datacenter server to the client. After the file system data has been dismounted from the client, the user no longer has access to that data at the datacenter server, although file system data may still persist in a local cache at the client.

Figure 5:
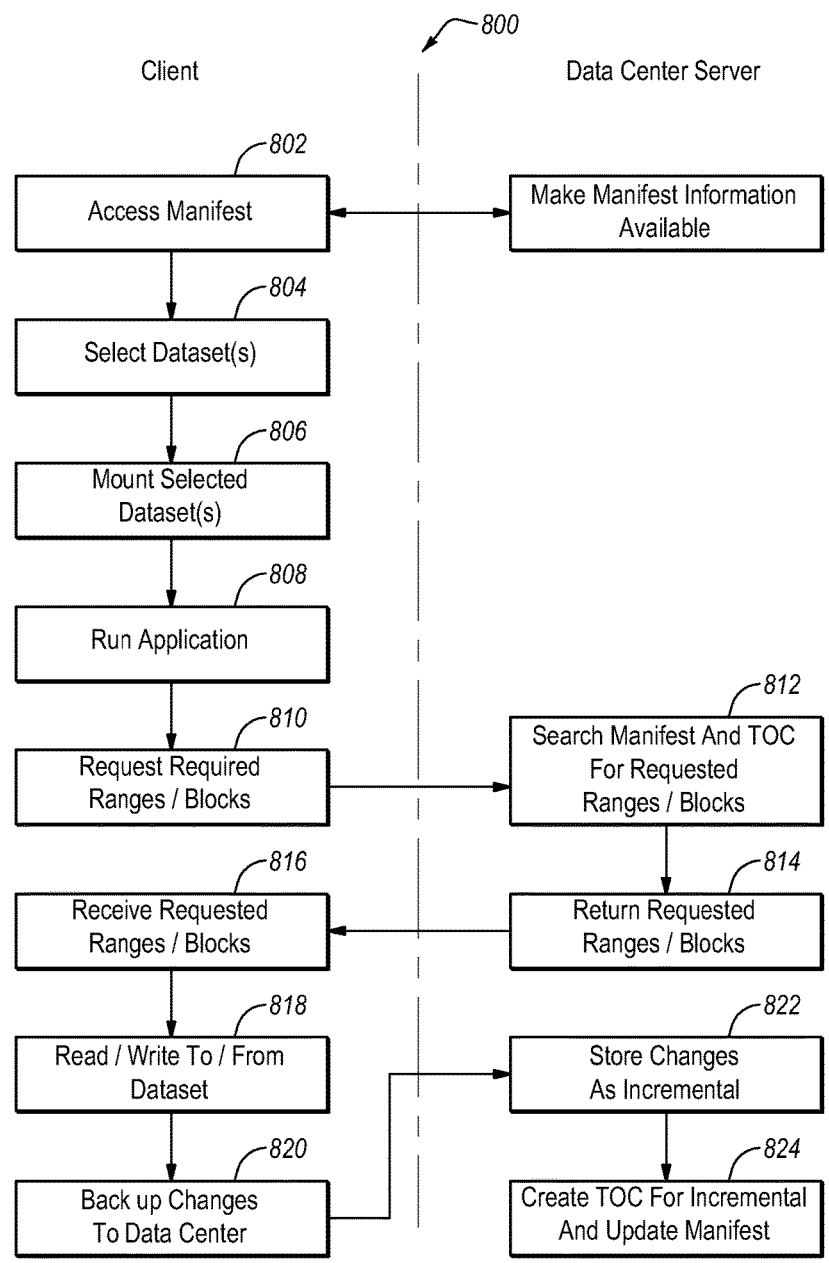
FIG. 5 is a flow diagram that provides additional information concerning aspects of the example method of FIG. 4.

With reference now to FIG. 5, further details are provided concerning a method 800 for the performance, by cooperation of the client and datacenter server, of file system operations, and concerning the associated interaction between the client and the datacenter server, first introduced in connection with processes 712/710 of FIG. 4. It should be noted that as the term 'operations' is used herein, that term is intended to be broad in scope. As such, operations are not necessarily concerned only with modifications to a dataset, but may relate to manipulations of the dataset, such as restore operations, that do not involve changes to the content of the dataset, such as moving or renaming a dataset without modifying the dataset content. As another example of operations that can be performed in connection with embodiments of the invention, a dataset such as a .VMDK file may not be modified, but simply locally restored, such as by being mounted on a client, so that the user can use that .VMDK file to locally boot the VM to which the .VMDK file pertains. This process of local restoration may be performed, for example, when the local copy of the .VMDK file is not working properly, or at all. Other example operations concerning datasets, such as files for example, are disclosed elsewhere herein.

The method 800 can begin at 802 when a user at a client accesses a manifest, by way of a browser for example, to view the available version(s) of datasets, such as files, that are listed in the manifest. The user can then select 804 the desired dataset(s) from the manifest. The dataset(s) can be selected based on various criteria. One such criterion is a particular cutoff date/time. In particular, the user can specify that he would like all datasets as they existed as of the cutoff date/time. As another example, the user can specify that he would like all datasets created before, or after, a particular time. A file system tool, embodiments of which are disclosed herein, is then used to mount 806 the selected dataset(s) at the client. In some instances at least, all of the datasets listed in the manifest can be mounted. The mounted datasets can include incrementals and/or a baseline dataset.

Once the dataset(s) of interest are mounted at the client, the user opens and runs 808 an application in anticipation of performing one or more operations concerning the mounted dataset(s), such as a file for example, with which the application is associated. As part of the operations of the application, the application can access various mounted datasets as virtual synthetics. Thus, a request 810 for particular byte ranges or blocks of a mounted dataset is transmitted to the datacenter server by way of a suitable interface, such as a REST API, for example. In some instances, a number of additional bytes on either side of the byte range may be returned by the datacenter, whether or not those additional bytes were specified by the request 810. As the foregoing makes clear, the datacenter can support client requests for mounting a file as that file existed at a particular date/time, and the datacenter can also support block level and byte range requests from the client.

In at least some embodiments, the file system tool at the client may first check the local cache to see if some or all of the bytes in the byte range to be requested are already present locally. By performing this check, the amount of data that may be needed from the datacenter server may be reduced if the local cache already includes some of that data. Moreover, even if this check is not performed, the datacenter can inform the file system tool at the client that at least some of the data in the requested dataset has already been transmitted to the client, and the datacenter can inform the file system tool where else that data appears in the file with which the dataset request is concerned.

After the dataset request is received at the datacenter server, the datacenter server can then search 812 a manifest and table of contents to determine the location of the requested byte range. The datacenter server can then assemble, potentially from multiple incrementals and/or a baseline dataset, and return 814 the requested data to the client. Where the file or other dataset that is mounted on a client device is synthesized from multiple baseline and incremental change sets, that file or other dataset may be referred to as a virtual synthetic. That is, and as noted elsewhere herein, the file that is mounted is synthetic in the sense that the portion is created, or synthesized, on an ad-hoc basis according to user requirements and the file does not exist separately on its own at the datacenter.

In at least some embodiments, the dataset transmitted from the datacenter server to the client is in an encrypted and compressed form so that only an authorized user with an appropriate key is able to access the dataset. In at least some embodiments, access to the dataset can be confined to a particular user and client. Thus, after receipt 816 at the client of the requested byte ranges or blocks, one embodiment of the method 800 includes decryption and decompression of the received data. As well, the data transmitted from the datacenter server to the client may be de-duplicated data. In at least some embodiments, one, some, or all of decryption, decompression, and deduplication can be performed by, or at the direction of, the file system tool.

The received dataset can be stored at the client, in a local cache for example. The storage of the dataset can be performed, for example, by the application in connection with which the request for the dataset was made. Thus, for example, if the request was made for a mailbox, or an individual email, the received dataset can be cached by the file system tool. At 818, the user can perform various file system operations concerning the cached data. As disclosed elsewhere herein, such file system operations can include, for example, reading from, and writing to, the cache. As another example, the user can employ the cached data to boot a virtual machine, as in the case where the cached data relates to a file such as a .VMDK file.

Once the user has completed the process of making changes to the cached data, the changes can then be transmitted 820 to the datacenter server for backup. This backup can be performed with any suitable backup client and backup application, and the data to be backed up can be compressed and encrypted prior to transmission from the client to the datacenter server. The received changes are then backed up 822, in the form of an incremental in at least some embodiments, at the datacenter server. As part of the backup process 822, the client can request creation or modification of the manifest, and the client can also request updates to the table of contents.

The dataset and changes stored in the local cache at the client may remain in that cache after those changes have been backed up at the datacenter server. Where this is the case, the client may be able to access the cached data later in connection with another request for a dataset. After the incremental has been stored 822 at the datacenter server, a table of contents can be created 824 for the incremental, and the manifest updated.

E. Aspects of Data Restore and Assembly Processes

Figure 6:
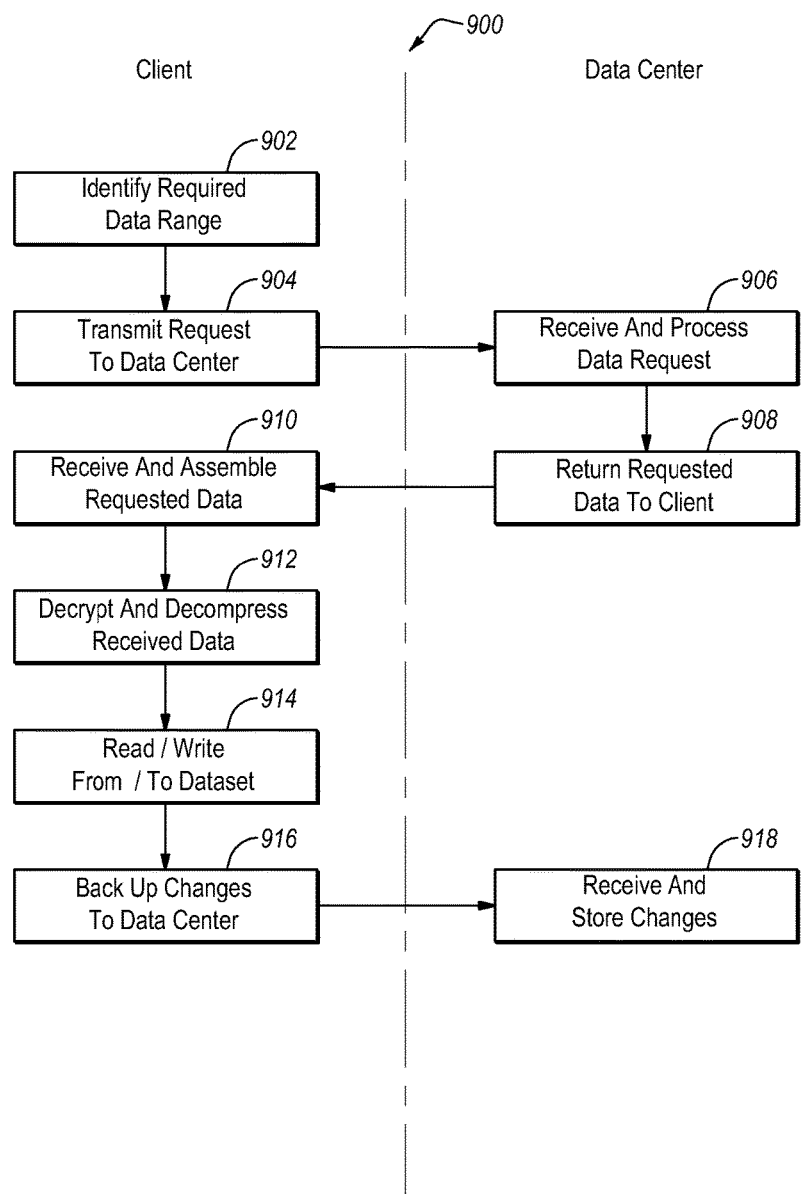
FIG. 6 discloses aspects of a client side process for identifying data to be restored to the client, and for processing the restored data.

With continued attention to FIG. 5, and directing attention now as well to FIG. 6, details are provided concerning some more particular embodiments of data restore and data assembly processes. One particular example of such a method is denoted generally at 900.

The method 900 can begin when a client identifies 902 a required data range to be retrieved from the datacenter and restored to the client. In general, the required data range may be associated with a particular file, and may embrace less than all of the data that makes up that file. The required data range can be specified in any suitable terms, such as a byte range for example. Moreover, multiple data ranges can be requested at the same time, either in a single request, or in multiple respective requests.

In one illustrative example, a user may wish to retrieve a particular email of a mailbox that has been backed up at the datacenter. Since there is no need to obtain the entire mailbox file, and to do so would be time consuming, the user can simply request the particular email by specifying, for example, the date and time of the email. This is simply one example of a way in which a byte range, or other data range, can be specified. As another example, a byte range could be specified that is limited to only those portions of a .VMDK file that are needed to boot the corresponding VM at a client system. The portions of the .VMDK file that are not needed to support the boot process would not be embraced in the specified byte range(s). In yet other embodiments, particular bytes, or blocks, can be identified for retrieval and restoration.

In some instances, and as the foregoing suggests, the data range request can be generated, automatically in some cases, in connection with the request for a file by an application at the client. The file request can then be translated at the client, by a file system tool or other application, into a request for a particular data range. In at least some instances, multiple requests can be generated and sent during the time that a user is making modifications to data at the client system. Moreover, the requests associated with a particular file can refer to multiple different incrementals of that file.

Once the data range request, or requests, have been created, those requests can be sent 904 from the client to the datacenter. The datacenter then receives and processes 906 the data range request(s). The requested data, which may be in an encrypted and compressed form, is then returned 908 from the datacenter to the client. In at least some embodiments, the data can be transmitted 908 from the datacenter in a form that requires the data to be assembled together before it can be used.

Accordingly, the data transmitted 908 by the datacenter in response to the data range request is received 910 at the client, and assembled if required. As noted above in the discussion of FIG. 5 for example, in some alternative embodiments, the datacenter server can assemble the data before returning the requested data to the client. When performed at the client, the assembly can be performed by the application in connection with which the data range request was defined, or can alternatively be performed by a file system tool, examples of which are disclosed elsewhere herein.

After, or before, the requested data has been assembled 910 at the client, that data may be decrypted and decompressed 912, if necessary. In at least some embodiments, only encrypted data passes between the client and the datacenter. Once the received data has been assembled and processed at the client, it is ready for use by the associated application and, accordingly, read and write operations 914 can be performed at the client with respect to that data. When client operations concerning the data have been completed, the changes to the data can be backed up 916 at the datacenter. In some instances, the changes can also be locally cached at the client.

After the changes have been received 918 from the client at the datacenter, the changes can be backed up at the datacenter as an incremental. Prior to backup of the changes, a deduplication process can be performed with respect to the changes received from the client.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for requesting and assembling data, comprising:
   specifying, at a client, a data range required by an application residing at the client, where the data range embraces less than all the contents of a file with which the data range is associated;
   formulating, at the client, a request that includes the identified data range, and transmitting the request to a datacenter where the file was previously backed up;
   receiving, at the client, data included in the data range from the datacenter, where the received data is in an unassembled form and the data received at the client is less than all the contents of the file, wherein the received data comprises respective portions of multiple incremental backups stored at the datacenter;

assembling the received data, wherein the received data that is assembled includes data in the requested data range; and performing one or more file system operations with respect to the assembled data.

2. The method as recited in claim 1, wherein the data range comprises one or more byte ranges associated with the file.

3. The method as recited in claim 1, wherein the received data comprises a portion of the file.

4. The method as recited in claim 1, wherein the request for the data range is generated by translating a file request made by an application or file system tool at the client.

5. The method as recited in claim 4, wherein when the file system tool formulates the request for the data range, the application views the request as a file read request.

6. The method as recited in claim 1, wherein a FUSE file enables specification of a particular byte range.

7. The method as recited in claim 1, wherein the client receives multiple data ranges in respective parallel streams from the datacenter.

8. The method as recited in claim 1, wherein the data received at the client from the datacenter is in an encrypted and compressed form.

9. The method as recited in claim 1, wherein assembly of the received data at the client is performed by a file system tool of the client.

10. The method as recited in claim 1, wherein the received data has been de-duplicated.

11. The method as recited in claim 1, further comprising decrypting and decompressing the received data.

12. A non-transitory storage medium having stored therein computer-executable instructions which, when executed by one or more hardware processors, request and assemble data by performing the following:

specifying, at a client, a data range required by an application residing at the client, where the data range embraces less than all the contents of a file with which the data range is associated;

formulating, at the client, a request that includes the identified data range, and transmitting the request to a datacenter where the file was previously backed up;

receiving, at the client, data included in the data range from the datacenter, where the received data is in an unassembled form and the data received at the client is less than all the contents of the file, wherein the received data comprises respective portions of multiple incremental backups stored at the datacenter;

assembling the received data, wherein the received data that is assembled includes data in the requested data range; and performing one or more file system operations with respect to the assembled data.

13. The non-transitory storage medium as recited in claim 12, wherein the request for the data range is generated by translating a file request made by an application or file system tool at the client.

14. The non-transitory storage medium as recited in claim 12, wherein a FUSE file enables specification of a particular byte range.

15. The non-transitory storage medium as recited in claim 12, wherein the client receives multiple data ranges in respective parallel streams from the datacenter.

16. The non-transitory storage medium as recited in claim 12, wherein the data received at the client from the datacenter is in an encrypted and compressed form.

17. A physical device, wherein the physical device comprises:

one or more hardware processors; and non-transitory storage medium having stored therein computer-executable instructions which, when executed by one or more hardware processors, request and assemble data by performing the following:

specifying, at a client, a data range required by an application residing at the client, where the data range embraces less than all the contents of a file with which the data range is associated;

formulating, at the client, a request that includes the identified data range, and transmitting the request to a datacenter where the file was previously backed up;

receiving, at the client, data included in the data range from the datacenter, where the received data is in an unassembled form and the data received at the client is less than all the contents of the file, wherein the received data comprises respective portions of multiple incremental backups stored at the datacenter;

assembling the received data, wherein the received data that is assembled includes data in the requested data range; and performing one or more file system operations with respect to the assembled data.

18. A cloud based datacenter that includes the physical device as recited in claim 17.

19. The method as recited in claim 1, wherein assembly of the data is performed by an application in connection with which the data range request was defined, or by a file system tool.

20. The non-transitory storage medium as recited in claim 12, wherein assembly of the data is performed by an application in connection with which the data range request was defined, or by a file system tool.

* * * * *